(12) United States Patent
Wang et al.

(10) Patent No.: US 10,893,487 B2
(45) Date of Patent: Jan. 12, 2021

(54) POWER HEADROOM REPORTING FOR HIGHER FREQUENCY CARRIERS IN NR

(71) Applicant: Telefonaktiebolaget LM Ericsson (publ), Stockholm (SE)

(72) Inventors: Min Wang, Luleå (SE); Mats Folke, Vällingby (SE); Jose Luis Pradas, Stockholm (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/341,213

(22) PCT Filed: Feb. 8, 2019

(86) PCT No.: PCT/SE2019/050109
§ 371 (c)(1),
(2) Date: Apr. 11, 2019

(87) PCT Pub. No.: WO2019/160474
PCT Pub. Date: Aug. 22, 2019

(65) Prior Publication Data
US 2020/0221396 A1    Jul. 9, 2020

Related U.S. Application Data

(60) Provisional application No. 62/631,038, filed on Feb. 15, 2018.

(51) Int. Cl.
*H04W 52/36* (2009.01)
*H04W 76/15* (2018.01)
*H04W 52/14* (2009.01)
*H04W 52/34* (2009.01)
*H04W 80/02* (2009.01)

(52) U.S. Cl.
CPC ....... *H04W 52/365* (2013.01); *H04W 52/146* (2013.01); *H04W 52/34* (2013.01); *H04W 52/367* (2013.01); *H04W 76/15* (2018.02); *H04W 80/02* (2013.01)

(58) Field of Classification Search
CPC .............. H04W 52/354; H04W 75/14; H04W 52/146; H04W 52/34; H04W 52/367; H04W 80/02
See application file for complete search history.

(56) References Cited

PUBLICATIONS

3GPP, "3rd Generation Partnership Project; Technical Specification Group Radio Access Network NR Radio Resource Control (RRC) protocol specification (Release 15)", 3GPP TS 38.331 V15.0.0, Dec. 2017, 1-188.

(Continued)

*Primary Examiner* — Ronald B Abelson
(74) *Attorney, Agent, or Firm* — Sage Patent Group

(57) ABSTRACT

Two or more formats for Power Headroom (PH) and maximum transmit power (Pcmax), and corresponding mapping tables, are defined. For example, both 6-bit and 7-bit PH and Pcmax formats are defined. In many cases, particularly when operating in the higher frequency FR2 range, a 7-bit PH or Pcmax may be required to adequately convey power headroom information. Numerous trigger criteria are defined which may indicate that one or the other format is preferred. The format selection must be communicated to the network, and subsequent Power Headroom Reports (PHR) will utilize the selected format.

24 Claims, 15 Drawing Sheets

(56) References Cited

PUBLICATIONS

3GPP, "3rd Generation Partnership Project; Technical Specification Group Radio Access Network; Evolved Universal Terrestrial Radio Access (E-UTRA); Requirements for support of radio resource management (Release 15)", 3GPP TS 36.133 V15.0.0, Sep. 2017, 1-69.

3GPP, "3rd Generation Partnership Project; Technical Specification Group Radio Access Network; NR; Medium Access Control (MAC) protocol specification (Release 15)", 3GPP TS 38.321 V15.0.0, Dec. 2017, 1-55.

3GPP, "3rd Generation Partnership Project; Technical Specification Group Radio Access Network; NR; Physical layer procedures for control (Release 15)", 3GPP TS 38.213 V15.0.0, Dec. 2017, 1-56.

3GPP, "3rd Generation Partnership Project; Technical Specification Group Radio Access Network; NR; Requirements for support of radio resource management (Release 15)", 3GPP TS 38.133 V15.0.0, Dec. 2017, 1-41.

3GPP, "3rd Generation Partnership Project; Technical Specification Group Radio Access Network; NR; User Equipment (UE) radio transmission and reception; Part 1: Range 1 Standalone (Release 15)", 3GPP TS 38.101-1 V15.0.0, Dec. 2017, 1-49.

Unknown, Author, "Reply LS on PHR mapping table for FR1 and FR2", 3GPP TSG RAN WG2#101, R2-1801731 corresponds to R4-1801078, Athens, Greece, Feb. 26-Mar. 2, 2018, 1-1.

Unknown, Author, "LCIDs for Act/Deact and PHR MAC CEs", 3GPP TSG-RAN WG2 Meeting #91bis, R2-154748, Nokia Networks, Malmo, Sweden, Oct. 5-9, 2015, 2 pages.

Unknown, Author, "On Improved Random Access Procedure for Rel-14 NB-IoT", 3GPP TSG RAN WG1 #91, R1-1719708, Ericsson, Reno, USA, Nov. 27-Dec. 1, 2017, 7 pages.

Unknown, Author, "On PHR Mapping and Requirements in NR", 3GPP TSG-RAN WG4 Meeting AH-1801, R4-1800773, Ericsson, San Diego, USA, Jan. 22-26, 2018, 3 pages.

POWER HEADROOM REPORTING FOR HIGHER FREQUENCY CARRIERS IN NR

RELATED APPLICATIONS

This application claims priority to U.S. Provisional Patent Application Ser. No. 62/631,038, titled "PHR Formats and Tables for Higher Frequency Carriers in NR," filed Feb. 15, 2018, the disclosure of which is incorporated here by reference in its entirety.

TECHNICAL FIELD

The present invention relates generally to wireless communication networks, and in particular to the reporting of power headroom, at least for higher frequency carriers, by User Equipment in New Radio.

BACKGROUND

Wireless communication networks are ubiquitous in many parts of the world, and continue to advance—in geographical footprint, number of subscribers, data rates, and services supported. As the technology continues to evolve, technical and operational standards are adopted that ensure interoperability of heterogeneous equipment. The Third Generation Partnership Project (3GPP) defined and published standards for third generation (3G) wireless communications (e.g., Universal Mobile Telecommunications Service, or UMTS, and advanced Code Division Multiple Access, or CDMA2000) and fourth generation (4G) systems (e.g., Long Term Evolution, or LTE and WiMAXX). Work is ongoing to define the fifth generation (5G), known as New Radio (NR). NR system will incorporate numerous advanced mobile telecomm technologies, including beamforming, massive Multiple Input-Multiple Output (MIMO), heterogeneous networks (het-nets), machine-type communications (MTC), and vastly expanded frequency ranges.

In NR, the network access node (also known as base station) is referred to as gNB. Mobile communication terminals are referred to as User Equipment (UE). This terminology is adopted herein.

Propagation Loss of NR Carriers

NR will support carrier frequencies from below 1 GHz to 100 GHz. For such huge frequency range, the attenuation characteristics can be very different between carriers with large frequency difference. Typically, the received power in the receiver side can be expressed as:

$$P_{rx} = P_{TX} \cdot G_{TX} \cdot G_{RX} \left(\frac{1}{4\pi rf}\right)^2 \cdot e^{-\varepsilon r}$$

where
  $P_{TX}$ is the transmit power by the transmitter;
  $G_{TX}$ and $G_{RX}$ are the gains of the transmitter and receiver antennas, respectively;
  r is the separation between the transmitter and receiver;
  f is the carrier frequency; and
  α is the attenuation factor due to absorption in the medium.

From this formula, it is evident that the attenuation of radio wave is proportional to $f^2$. For the same propagation distance, a 60 GHz signal is attenuated 29.5 dB more than the same signal at 2 GHz, without considering the oxygen absorption.

PHR Procedure in NR

The difference between the maximum theoretical transmit power of a UE, and its actual current transmit power, is known as the UE's "power headroom." It is important for the network access node (also known as the base station) managing each UE to be aware of the UE's power headroom (PH). Accordingly, UEs periodically transmit a Power Headroom Report (PHR) to the network.

In the current Media Access Controller (MAC) specification for NR (3GPP TS 38.321 version 15.0.0), the PHR procedure is defined in the section 5.4.6, which is reproduced below:

The Power Headroom reporting procedure is used to provide the serving gNB with information about the difference between the nominal UE maximum transmit power and the estimated power for UL-SCH transmission per activated Serving Cell and also with information about the difference between the nominal UE maximum power and the estimated power for UL-SCH and PUCCH transmission on SpCell and PUCCH SCell.

RRC controls Power Headroom reporting by configuring the following parameters:
  phr-PeriodicTimer;
  phr-ProhibitTimer;
  phr-Tx-PowerFactorChange;
  phr-Type2PCell;
  phr-Type2OtherCell;
  phr-ModeOtherCG;
  multiplePHR.

A Power Headroom Report (PHR) shall be triggered if any of the following events occur:
  phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;
  phr-PeriodicTimer expires;
  upon configuration or reconfiguration of the power headroom reporting functionality by upper layers, which is not used to disable the function;
  activation of an SCell of any MAC entity with configured uplink;
  addition of the PSCell;
  phr-Prohibit Timer expires or has expired, when the MAC entity has UL resources for new transmission, and the following is true for any of the activated Serving Cells of any MAC entity with configured uplink:
    there are UL resources allocated for transmission or there is a PUCCH transmission on this cell, and the required power backoff due to power management (as allowed by P-MPRc as specified in TS 38.101) for this cell has changed more than phr-Tx-PowerFactorChange dB since the last transmission of a PHR when the MAC entity had UL resources allocated for transmission or PUCCH transmission on this cell.
  NOTE: The MAC entity should avoid triggering a PHR when the required power backoff due to power management decreases only temporarily (e.g. for up to a few tens of milliseconds) and it should avoid reflecting such temporary decrease in the values of $P_{CMAX,c}$/PH when a PHR is triggered by other triggering conditions.

If the MAC entity has UL resources allocated for new transmission the MAC entity shall:

1> if it is the first UL resource allocated for a new transmission since the last MAC reset:
2> start periodicPHR-Timer;
1> if the Power Headroom reporting procedure determines that at least one PHR has been triggered and not cancelled, and;
1> if the allocated UL resources can accommodate the MAC CE for PHR which the MAC entity is configured to transmit, plus its subheader, as a result of logical channel prioritization:
2> if multiplePHR is configured:
3> for each activated Serving Cell with configured uplink associated with any MAC entity:
4> obtain the value of the Type 1 or Type 3 power headroom for the corresponding uplink carrier;
4> if this MAC entity has UL resources allocated for transmission on this Serving Cell; or
4> if the other MAC entity, if configured, has UL resources allocated for transmission on this Serving Cell and phr-ModeOtherCG is set to real by upper layers:
5> obtain the value for the corresponding $P_{CMAX,c}$ field from the physical layer.
3> if phr-Type2PCell is configured:
4> obtain the value of the Type 2 power headroom for the PCell;
4> obtain the value for the corresponding $P_{CMAX,c}$ field from the physical layer.
3> if phr-Type2OtherCell is configured:
4> if PUCCH SCell is configured:
5> obtain the value of the Type 2 power headroom for the PUCCH SCell.
4> else (i.e. other CG is configured):
5> obtain the value of the Type 2 power headroom for the SpCell of the other MAC entity.
4> obtain the value for the corresponding $P_{CMAX,c}$ field from the physical layer.
3> instruct the Multiplexing and Assembly procedure to generate and transmit a PHR MAC CE according to configured ServCellIndex and the PUCCH(s) for the MAC entity as defined in subclause 6.1.3.9 based on the values reported by the physical layer.
2> else (i.e. Single Entry PHR format is used):
3> obtain the value of the Type 1 or Type 3 power headroom from the physical layer for the corresponding uplink carrier;
3> instruct the Multiplexing and Assembly procedure to generate and transmit a PHR MAC CE as defined in subclause 6.1.3.8 based on the value reported by the physical layer.
2> start or restart periodicPHR-Time
2> start or restart prohibitPHR-Timer,
2> cancel all triggered PHR(s).

PHR MAC CEs in NR

In the current MAC spec for NR (3GPP TS 38.321 version 15.0.0), the PHR MAC Control Elements (CEs) are defined in sections 6.1.3.8 and 6.1.3.9 and are reproduced below:
6.1.3.8 Single Entry PHR MAC CE
The Single Entry PHR MAC CE is identified by a MAC PDU subheader with LCID as specified in Table 6.2.1-2. It has a fixed size and consists of two octet defined as follows (FIG. 6.1.3.8-1):

R: reserved bit, set to "0";

Power Headroom (PH): this field indicates the power headroom level. The length of the field is 6 bits. The reported PH and the corresponding power headroom levels are shown in Table 6.1.3.8-1 below (the corresponding measured values in dB are specified in TS 38.133);

$P_{CMAX,c}$: this field indicates the $P_{CMAX,c}$ (as specified in TS 38.213) used for calculation of the preceding PH field. The reported $P_{CMAX,c}$ and the corresponding nominal UE transmit power levels are shown in Table 6.1.3.8-2 (the corresponding measured values in dB are specified in TS 38.133).

TABLE 6.1.3.8-1

Power Headroom levels for PHR

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 6.1.3.8-2

Nominal UE transmit power level for PHR

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

6.1.3.9 (Multiple Entry PHR MAC CE)

The Multiple Entry PHR MAC CE is identified by a MAC PDU subheader with LCID as specified in Table 6.2.1-2. It includes the bitmap, a Type 2 PH field and an octet containing the associated $P_{CMAX,c}$ field (if reported) for the PCell, a Type 2 PH field and an octet containing the associated $P_{CMAX,c}$ field (if reported) for either PSCell or PUCCH SCell, a Type 1 PH field and an octet containing the associated $P_{CMAX,c}$ field (if reported) for the PCell. It further includes, in ascending order based on the ServCellIndex, one or multiple of Type 1 PH fields and octets containing the associated $P_{CMAX,c}$ fields (if reported) for SCells indicated in the bitmap.

The presence of Type 2 PH field for PCell is configured by phr-Type2PCell, and the presence of Type 2 PH field for either PSCell or for PUCCH SCell is configured by phr-Type2OtherCell.

A single octet bitmap is used for indicating the presence of PH per SCell when the highest SCellIndex of SCell with configured uplink is less than 8, otherwise four octets are used.

UE determines whether PH value for an activated Serving Cell is based on real transmission or a reference format by considering the downlink control information which has been received until and including the PDCCH occasion in which the first UL grant is received since a PHR has been triggered.

The PHR MAC CEs are defined as follows:

Ci: this field indicates the presence of a PH field for the SCell with SCellIndex i as specified in TS 38.331 [5]. The Ci field set to "1" indicates that a PH field for the SCell with SCellIndex i is reported. The Ci field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2, and Type 3 PH, V=0 indicates the presence of the octet containing the associated $P_{CMAX,c}$ field, and V=1 indicates that the octet containing the associated $P_{CMAX,c}$ field is omitted;

Power Headroom (PH): this field indicates the power headroom level. The length of the field is 6 bits. The reported PH and the corresponding power headroom levels are shown in Table 6.1.3.8-1 (the corresponding measured values in dB for the NR serving cell are specified in TS 38.133 while the corresponding measured values in dB for the LTE serving cell are specified in TS 36.133);

P: this field indicates whether the MAC entity applies power backoff due to power management. The MAC entity shall set P=1 if the corresponding $P_{CMAX,c}$ field would have had a different value if no power backoff due to power management had been applied;

$P_{CMAX,c}$: if present, this field indicates the $P_{CMAX,c}$ or $P_{CMAX,c}$ (as specified in TS 38.213) used for calculation of the preceding PH field. The reported $P_{CMAX,c}$ and the corresponding nominal UE transmit power levels are shown in Table 6.1.3.8-2 (the corresponding measured values in dB for the NR serving cell are specified in TS 38.133 while the corresponding measured values in dB for the LTE serving cell are specified in TS 36.133).

PHR Requirements

In LTE, 3GPP specified the PHR period requirements and PHR reporting delay requirements. According to the former, the reported PH shall be estimated over 1 subframe or 1 slot or subslot in use by the UE for the uplink. For the latter, the PHR reporting delay is defined as the time between the beginning of the power headroom reference period and the time when the UE starts transmitting the power headroom over the radio interface. The reporting delay of the power headroom shall be 0 ms, which is applicable for all configured triggering mechanisms for power headroom reporting. In LTE, the reporting mapping for PHR is according to the table below and is within the range from −23 . . . +40 dB with 1 dB resolution. For NR, the details of PHR values, mapping, and requirements are still undefined.

| Reported value | Measured quantity value (dB) |
| --- | --- |
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |

-continued

| Reported value | Measured quantity value (dB) |
| --- | --- |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| . . . | . . . |
| POWER_HEADROOM_57 | 34 ≤ PH < 35 |
| POWER_HEADROOM_58 | 35 ≤ PH < 36 |
| POWER_HEADROOM_59 | 36 ≤ PH < 37 |
| POWER_HEADROOM_60 | 37 ≤ PH < 38 |
| POWER_HEADROOM_61 | 38 ≤ PH < 39 |
| POWER_HEADROOM_62 | 39 ≤ PH < 40 |
| POWER_HEADROOM_63 | PH ≥ 40 |

PHR Types

There are three types of PHR, which are either configurable by higher layers or calculated by the UE under certain assumptions. All three types depend on and all depend on $P_{CMAX,c}$. The UE may also be configured to report $P_{CMAX,c}$ itself together with PHR. Hence, the $P_{CMAX,c}$ and the way it is determined impact also the reported PHR value.

Type 1:

If the UE transmits PUSCH without PUCCH in subframe/slot/subslot i for serving cell c, power headroom for a Type 1 report is computed using:

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]},$$

where $P_{CMAX,c}(i)$ is the configured UE transmit power in subframe/slot/subslot i for serving cell c.

If the UE transmits PUSCH with PUCCH in subframe/slot/subslot i for serving cell c, power headroom for a Type 1 report is computed using:

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}$$

where $\tilde{P}_{CMAX,c}(i)$ is computed based on the requirements in assuming a PUSCH only transmission in subframe/slot/subslot i. For this case, the physical layer delivers $\tilde{P}_{CMAX,c}(i)$ instead of $P_{CMAX,c}(i)$ to higher layers.

If the UE does not transmit PUSCH in subframe/slot/subslot i for serving cell c, or if the UE is configured with an LAA SCell for uplink transmissions and receives DCI Format 0A/0B/4A/4B with PUSCH trigger A set to 1 on a serving cell c and if the UE reports power headroom in the PUSCH transmission corresponding to the DCI in serving cell c, then the power headroom for a Type 1 report is computed using:

$$PH_{type1,c}(i) = \tilde{P}_{CMAX,c}(i) - \{P_{O\_PUSCH,c}(1) + \alpha_c(1) \cdot PL_c + f_c(i)\} \text{ [dB]}$$

where $\tilde{P}_{CMAX,c}(i)$ is a computed value.

Type 2:

If the UE transmits PUSCH simultaneously with PUCCH in subframe/slot/subslot i for the primary cell, power headroom for a Type 2 report is computed using:

$$PH_{type2}(i) = P_{CMAX,c}(i) - 10\log_{10}\left(\begin{array}{c}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10}\end{array}\right) [dB]$$

where $P_{CMAX,c}(i)$ is configured by higher layers.

If the UE transmits PUSCH without PUCCH in subframe/slot/subslot i for the primary cell, power headroom for a Type 2 report is computed using:

$$PH_{type2}(i) = P_{CMAX,c}(i) - 10\log_{10}\left(\begin{array}{c}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+g(i))/10}\end{array}\right) [dB]$$

where $P_{CMAX,c}(i)$ is configured by higher layers.

If the UE transmits PUCCH without PUSCH in subframe/slot/subslot i for the primary cell, power headroom for a Type 2 report is computed using:

$$PH_{type2}(i) = P_{CMAX,c}(i) - 10\log_{10}\left(\begin{array}{c}10^{(P_{O\_PUSCH,c}(1)+\alpha_c(1)\cdot PL_c+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10}\end{array}\right) [dB]$$

where $P_{CMAX,c}(i)$ is configured by higher layers.

If the UE does not transmit PUCCH or PUSCH in subframe/slot/subslot i for the primary cell, power headroom for a Type 2 report is computed using:

$$PH_{type2}(i) = \tilde{P}_{CMAX,c}(i) - 10\log_{10}\left(\begin{array}{c}10^{(P_{O\_PUSCH,c}(1)+\alpha_c(1)\cdot PL_c+f_c(i))/10} + \\ 10^{(P_{0\_PUCCH}+PL_c+g(i))/10}\end{array}\right) [dB]$$

where $\acute{P}_{CMAX,c}(i)$ is computed.

Type 3:

For serving cell c with frame structure type 2, and not configured for PUSCH/PUCCH transmission, if the UE transmits SRS in subframe i for serving cell c, power headroom for a Type 3 report is computed using:

$$PH_{type3,c}(i) = P_{CMAX,c}(i) - \{10\ \log_{10}(M_{SRS,c}) + P_{O\_SRS,c}(m) + \alpha_{SRS,c}\cdot PL_c + f_{SRS,c}(i)\}\ [dB]$$

where $P_{CMAX,c}(i)$ is configured by higher layers.

If the UE does not transmit SRS in subframe i for serving cell c, power headroom for a Type 3 report is computed using:

$$PH_{type3,c}(i) = \tilde{P}_{CMAX,c}(i) - \{P_{O\_SRS,c}(1) + \alpha_{SRS,c}\cdot PL_c + f_{SRS,c}(i)\}\ [dB]$$

where $PL_c$ is defined in Subclause 5.1.1.1, $P_{O\_SRS,c}(1)$, $\alpha_{SRS,c}$, and $f_{SRS,c}(i)$ are defined in Subclause 5.1.3.1, and $\tilde{P}_{CMAX,c}(i)$ is computed.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

In a 3GPP Liaison Statement (LS) (R4-1801078, "Reply LS on PHR mapping table for FR1 and FR2"), RAN4 has suggested to have 7 bits for the PH field in the PHR MAC CE. In that LS, RAN4 suggested that a single PHR mapping table, with 1 dB resolution and entries comprising 7 bits, be applied for PHR in both frequency regions FR1 and FR2. There are several motivations for this configuration of PHR mapping table. First, an NR serving cell can be deployed at much higher frequency carriers than LTE. The propagation properties of such carriers are much different than those of the carriers at lower frequency regions. Second, the means of estimating the PHR will likely be different than those used in LTE (e.g., based on Pcmax, which in turn is based on EIRP, at least for the frequency range FR2). Third, NR defines new UE power classes, which will allow UEs to transmit up to a higher maximum transmission power level than in LTE. In light of these factors, changes in PHR formats and tables are necessary. Considering the fact that NR cells may support both a low frequency region and a high frequency region, the design of PHR formats and tables must be flexible considering the backward compatibility and forward outlook.

According to embodiments of the present invention, both 6-bit and 7-bit PH and Pcmax formats are defined. In many cases, particularly when operating in the higher frequency FR2 range, a 7-bit PH or Pcmax may be required to adequately convey power headroom information. Numerous trigger criteria are defined which may indicate that one or the other format is preferred. The format selection must be communicated to the network, and subsequent PHRs will utilize the selected format.

One embodiment relates to a method, performed by a wireless device, of reporting transmission power information to a network node in a wireless communication network. Which of two or more formats for power headroom (PH) or maximum transmission power (Pcmax) or mapping tables for PH or Pcmax, to employ is selected, in response to detecting one or more trigger criteria. The selection of formats for PH or Pcmax, or selection of mapping tables for PH or Pcmax, is communicated with the network. A power headroom report (PHR) comprising at least one of a PH or Pcmax index with the selected format, based on the selected PH or Pcmax mapping table, respectively, is transmitted to the network.

Another embodiment relates to a wireless device operative to report transmission power information to a network node in a wireless communication network. The wireless device includes communication circuitry and processing circuitry operatively connected to the communication circuitry. The processing circuitry is adapted to select which of two or more formats for power headroom, PH, or maximum transmission power, Pcmax, or mapping tables for PH or Pcmax, to employ in response to detecting one or more trigger criteria; communicate the selection of formats for PH or Pcmax, or selection of mapping tables for PH or Pcmax, with the network; and transmit to the network a power headroom report (PHR) comprising at least one of a PH or Pcmax index with the selected format, based on the selected PH or Pcmax mapping table, respectively.

Yet another embodiment relates to a method, performed by a node operative in a wireless communication network, of receiving transmission power information from a wireless device. The selection of which of two or more formats for power headroom (PH) or maximum transmission power (Pcmax), or mapping tables for PH or Pcmax, to employ in response to one or more trigger criteria, is communicated with the wireless device. A power headroom report (PHR) comprising at least one of a PH or Pcmax index with the selected format, based on the selected PH or Pcmax mapping table, respectively, is received from the wireless device.

Still another embodiment relates to a network node operative in a wireless communication network and operative to receive transmission power information from a wireless device. The network node includes communication circuitry and processing circuitry operatively connected to the communication circuitry. The processing circuitry is adapted to communicate the selection of which of two or more formats for power headroom (PH) or maximum transmission power (Pcmax), or mapping tables for PH or Pcmax, to employ in response to one or more trigger criteria, with the wireless device; and receive from the wireless device a power headroom report (PHR) comprising at least one of a PH or Pcmax index with the selected format, based on the selected PH or Pcmax mapping table, respectively.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
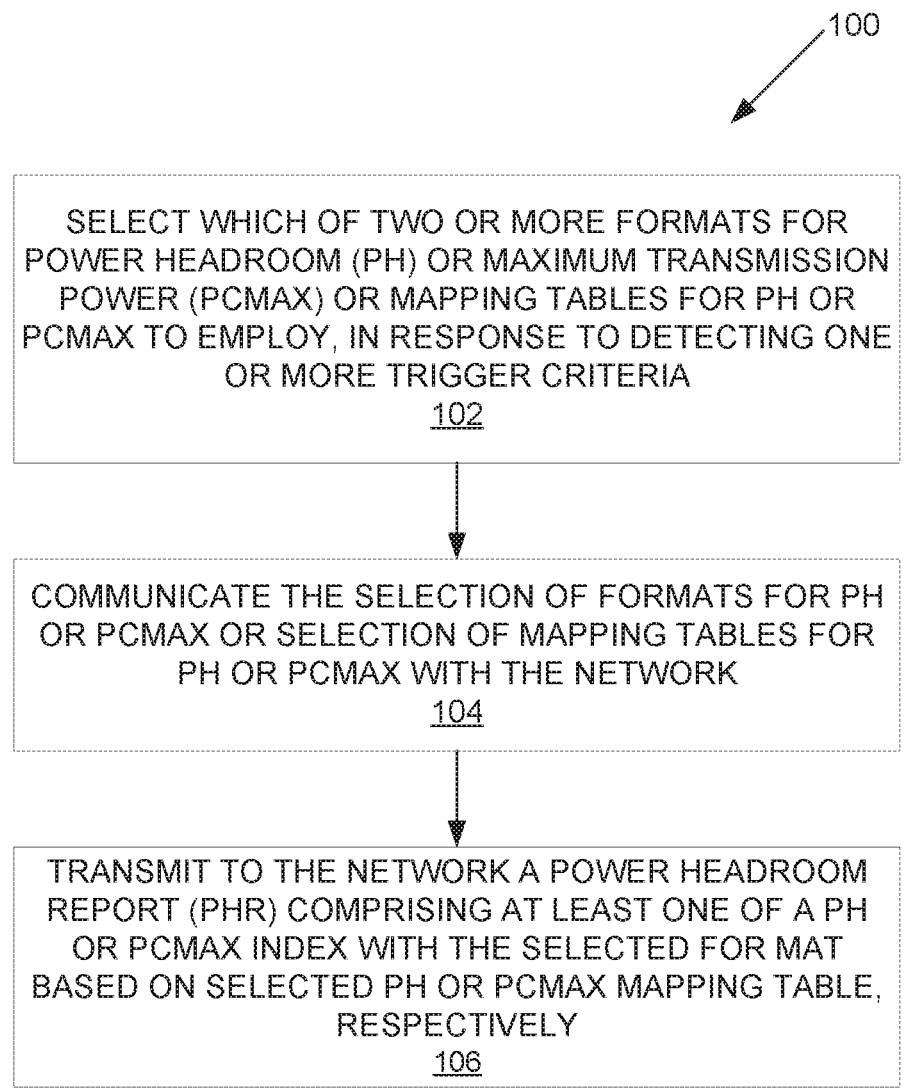
FIG. 1 is a flow diagram of a method, performed by a wireless device, of reporting transmission power information to a network node in a wireless communication network.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Formats for PH, Pcmax, Mapping Tables, and PHR

According to embodiments of the present invention, the Power Headroom Report (PHR) format and PHR tables are updated to support Power Headroom (PH), or maximum transmission power (Pcmax) fields with 6 bits as well as PH or Pcmax fields with more than 6 bits (e.g., 7 bits). Correspondingly, the mapping tables for PH or Pcmax may utilize 6 or 7 (or more) bits.

Embodiments described herein relate to methods and apparatuses corresponding to both wireless devices and corresponding network nodes. The wireless device selects which of two (or more) formats for PH of Pcmax to use, or the corresponding mapping tables, and communications the format selection to the network. The wireless device then transmits a PHR to the network, with a PH or Pcmax index with the selected format, based on the selected mapping table. Similarly, the network node communicates with a wireless device the selection of which of two or more formats for PH or Pcmax, or mapping tables for PH or Pcmax, to employ. The node then receives from the wireless device a PHR comprising at least one of a PH or Pcmax index with the selected format, based on the selected PH or Pcmax mapping table, respectively.

The usage of PH or Pcmax fields and corresponding mapping tables is flexible, and may be selected based on one a number of factors.

For example, the selection of format for the PH or Pcmax fields may depend on the carrier frequency or carrier frequency range associated with a UE's serving cell. This may be the carrier frequency operated by the network node, or it may be the carrier frequency operated by a second network node, e.g., when the UE is in LTE-NR dual connectivity, and the node receiving a PHR from the UE is aware of that carrier frequency. The PHR-receiving node may be aware of the carrier frequency, for example, based on a message or indication from the second network node, or based on a message received from the UE.

As another example, the selection of format for the PH or Pcmax fields may depend on the UE's ability to operate in a certain frequency range. For example, it may be determined by the network based on a message or indication received from the UE.

As yet another example, the selection of format for the PH or Pcmax fields may depend on a capability of the UE associated with its power class. For example, the capability may be the UE maximum transmit power, which may be indicated to the network by the UE.

As still another example, the selection of format for the PH or Pcmax fields may depend on the Pcmax estimation plane—that is, the method by which the Pcmax is estimated. For example, it may be based on EIRP, or it may follow an LTE-like approach (i.e., it may be predefined or determined by the network based on a message received from the UE).

Still further, the selection of format for the PH or Pcmax fields may depend on the UE's ability or capability to support the extended PHR range. This capability may be signaled to the network.

Even further, the selection of format for the PH or Pcmax fields may depend on the PHR format type configured or selected by the network node. For example, the network node may select a format out of a plurality comprising at least two formats—e.g., one based on 7-bit format and another based on 6-bit format for PH and/or Pcmax. The UE would then use the format selected by the network node.

In one embodiment, the UE selects and reports a certain PHR format based on, e.g., and of the factors described above. For example, for low frequencies (e.g., comprised in a first frequency range FR1) one PHR format is used, while for high frequencies (e.g., comprised in a second frequency range FR2), another PHR format is used.

In one embodiment, for low frequencies, a 6-bit field for the PH field and Pcmax field is sufficient. For high frequencies, a longer format, e.g., 7 or 8 bits-field format, for PH and/or Pcmax is used. In this case, the UE may use the legacy format, additionally using the R bits to achieve the wider bit width. In another embodiment, a new PHR format is introduced to accommodate the relevant number of bits.

Methods and Apparatuses

FIG. 1 depicts a method 100, performed by a wireless device, of reporting transmission power information to a network node in a wireless communication network. Which of two or more formats for power headroom (PH) or maximum transmission power (Pcmax), or mapping tables for PH or Pcmax, to employ is selected, in response to detecting one or more trigger criteria (block 102). The selection of formats for PH or Pcmax, or selection of mapping tables for PH or Pcmax, is communicated with the network (block 104). A power headroom report (PHR), comprising at least one of a PH or Pcmax index with the selected format, based on the selected PH or Pcmax mapping table, respectively, is transmitted to the network (block 106).

Figure 2:
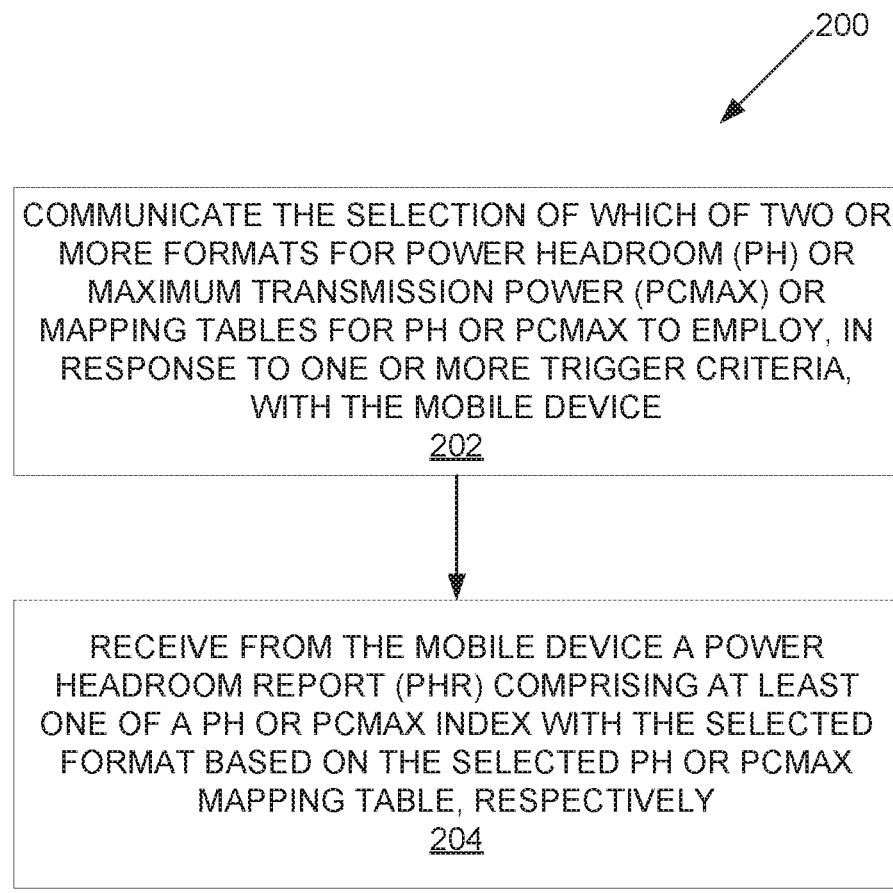
FIG. 2 is a flow diagram of a method, performed by a node operative in a wireless communication network, of receiving transmission power information from a wireless device.

FIG. 2 depicts a method 200, performed by a node operative in a wireless communication network, of receiving transmission power information from a wireless device. The selection of which of two or more formats for power headroom (PH) or maximum transmission power (Pcmax), or mapping tables for PH or Pcmax, to employ in response to one or more trigger criteria, is communicated with the wireless device (block 202). A power headroom report (PHR), comprising at least one of a PH or Pcmax index with the selected format, based on the selected PH or Pcmax mapping table, respectively, is received from the wireless device (block 204).

The apparatuses described herein may perform the methods 100, 200 herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 3:
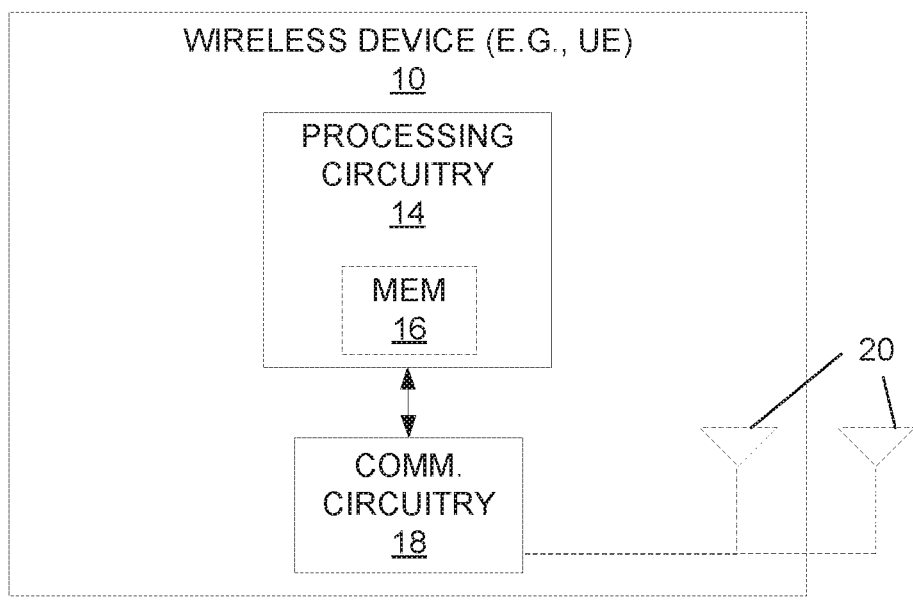
FIG. 3 is a block diagram of a wireless device.

FIG. 3 for example illustrates a wireless device 10 as implemented in accordance with one or more embodiments. A wireless device 10 is any type device capable of communicating with a network node and/or access point using radio signals. A wireless device 10 may therefore refer to a machine-to-machine (M2M) device, a machine-type communications (MTC) device, a Narrowband Internet of Things (NB IoT) device, etc. The wireless device 10 may also be referred to as a User Equipment (UE), such as a cellular telephone or "smartphone," however, the term UE should be understood to encompass any wireless device 10. A wireless device 10 may also be referred to as a radio device, a radio communication device, a wireless device, a wireless terminal, or simply a terminal—unless the context indicates otherwise, the use of any of these terms is intended to include device-to-device UEs or devices, machine-type devices, or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices, although referred to as UEs, but may be configured to transmit and/or receive data without direct human interaction.

In some embodiments, the wireless device 10 includes a user interface, including e.g. a display, touchscreen, keyboard or keypad, microphone, speaker, and the like (not shown); in other embodiments, such as in many M2M, MTC, or NB IoT scenarios, the wireless device 10 may include only a minimal, or no, user interface. The wireless device 10 also includes processing circuitry 14; memory 16; and communication circuitry 18 connected to one or more antennas 20, to effect wireless communication across an air interface to one or more radio network nodes, such as a base station, and/or access points. As indicated by the dashed lines, the antenna(s) 20 may protrude externally from the wireless device 10, or the antenna(s) 20 may be internal. In some embodiments, a wireless device 10 may additionally include features such as a camera, accelerometer, satellite navigation signal receiver circuitry, vibrating motor, and the like (not depicted in FIG. 3).

According to embodiments of the present invention, the memory 16 is operative to store, and the processing circuitry 14 is operative to execute, software which when executed is operative to cause the wireless device 10 to select among two or more formats for PH and Pcmax, or associated mapping tables. In particular, the software, when executed on the processing circuitry 14, is operative to perform the method 100 described and claimed herein. The processing circuitry 14 in this regard may implement certain functional means, units, or modules.

Figure 4:
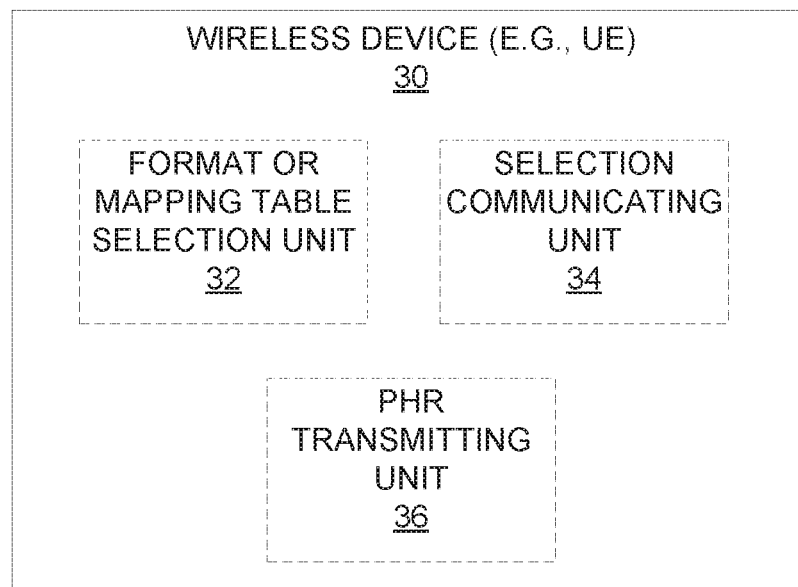
FIG. 4 is a block diagram of a wireless device showing functional units.

FIG. 4 illustrates a schematic block diagram of a wireless device 30 in a wireless network according to still other embodiments. As shown, the wireless device 30 implements various functional means, units, or modules, e.g., via the processing circuitry 14 in FIG. 3 and/or via software code. These functional means, units, or modules, e.g., for implementing the method(s) herein, include for instance: a format or mapping table selection unit 32, a selection communicating unit 34, and a PHR transmitting unit 36.

The format or mapping table selection unit 32 is configured to select which of two or more formats for power headroom (PH) or maximum transmission power (Pcmax), or mapping tables for PH or Pcmax, to employ in response to detecting one or more trigger criteria. The selection communicating unit 34 is configured to communicate the selection of formats for PH or Pcmax, or selection of mapping tables for PH or Pcmax, with the network. The PHR transmitting unit 36 is configured to transmit to the network a power headroom report (PHR) comprising at least one of a PH or Pcmax index with the selected format, based on the selected PH or Pcmax mapping table, respectively.

Figure 5:
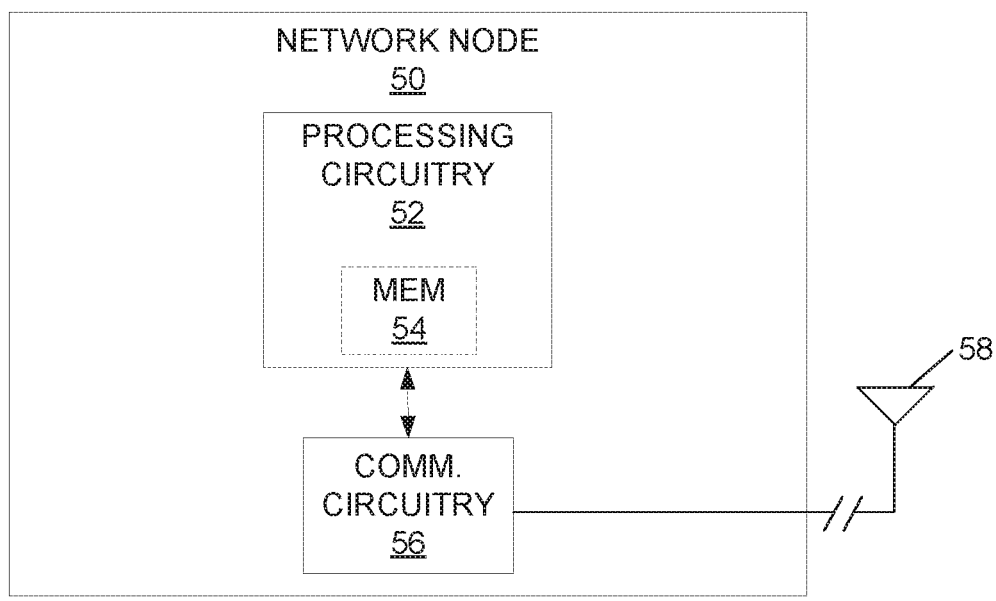
FIG. 5 is a block diagram of a base station.

FIG. 5 depicts a base station 50 operative in a wireless communication network. The base station 50 includes processing circuitry 52; memory 54; and communication circuitry 56 connected to one or more antennas 58, to effect wireless communication across an air interface to one or more wireless devices 10. As indicated by the broken connection to the antenna(s) 58, the antenna(s) 58 may be physically located separately from the base station 50, such as mounted on a tower, building, or the like. Although the memory 54 is depicted as being internal to the processing circuitry 52, those of skill in the art understand that the memory 54 may also be external. Those of skill in the art additionally understand that virtualization techniques allow some functions nominally executed by the processing circuitry 52 to actually be executed by other hardware, perhaps remotely located (e.g., in the so-called "cloud"). The base station 50 is known in LTE as a eNodeB or eNB, and in New Radio (NR) as gNB. In general, in other wireless communication networks, the base station 50 may be known as a Radio Base Station, Base Transceiver Station, Access Point, or the like.

According to one embodiment of the present invention, the processing circuitry 52 is operative to cause the base station 50 to communicate the selection of format from among two or more for PH and Pcmax or mapping tables, and receive a PHR from a wireless device. In particular, the processing circuitry 52 is operative to perform the method 200 described and claimed herein. The processing circuitry 52 in this regard may implement certain functional means, units, or modules.

Figure 6:
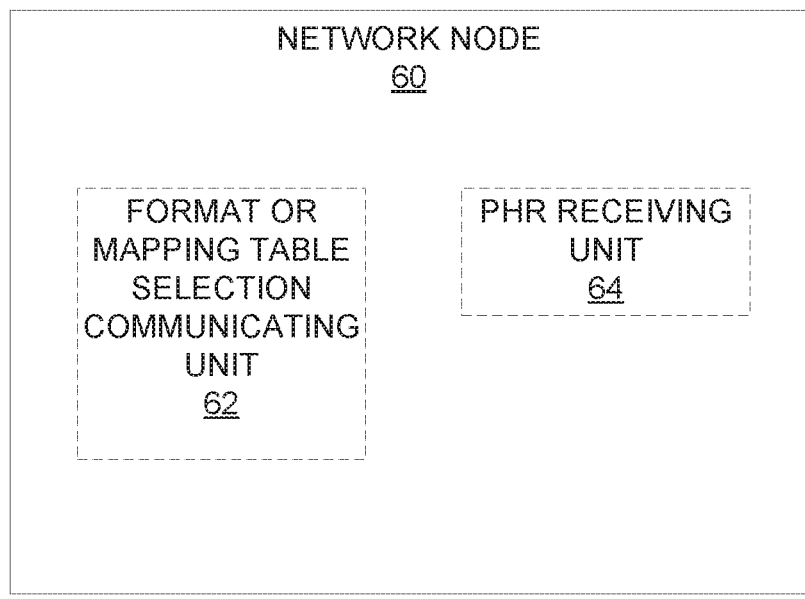
FIG. 6 is a block diagram of a base station showing functional units.

FIG. 6 illustrates a schematic block diagram of a base station 60 in a wireless network according to still other embodiments. As shown, the base station 60 implements various functional means, units, or modules, e.g., via the processing circuitry 52 in FIG. 7 and/or via software code. These functional means, units, or modules, e.g., for implementing the method 200 herein, include for instance: format or mapping table selection communicating unit 62 and PHR receiving unit 64.

The format or mapping table selection communicating unit 62 is configured to communicate the selection of which of two or more formats for power headroom (PH) or maximum transmission power (Pcmax), or mapping tables for PH or Pcmax, to employ in response to one or more trigger criteria, with the wireless device. The PHR receiving unit 64 is configured to receive, from the wireless device, a power headroom report (PHR), comprising at least one of a PH or Pcmax index with the selected format, based on the selected PH or Pcmax mapping table, respectively.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present invention provide numerous advantages over the prior art. The PHR can be selectively reported with different sizes of PH fields, and different PHR tables, based on the need and/or UE capability and/or configuration. A better flexibility is thus achieved. The PHR report is achieved with better accuracy, fitting in particular with the NR demands.

Although embodiments of the present invention are discussed herein with reference to LTE, NR, LTE-M, and NB-IoT, e.g., referring to UEs, eNB, gNB, and the like, the invention is not limited to these standardized wireless communication network protocols. Rather, embodiments of the present invention may be advantageously deployed in any wireless communication network in which power headroom or max power reporting may require large dynamic range, necessitating the use of more than one format (e.g., 6-bit and 7-bit formats). As such, those of skill in the art will understand that the claims are to be construed broadly—for example, the term "base station" encompasses any wireless network node that serves as an access point, or RAN terminal, for wireless communication with wireless devices. As used herein, the phrase "one of A and B" means the logical OR of A and B (as opposed to XOR), and is satisfied by one or more A without B, one or more B without A, or any number of A together with any number of B.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Over the Top Embodiments

Figure 7:
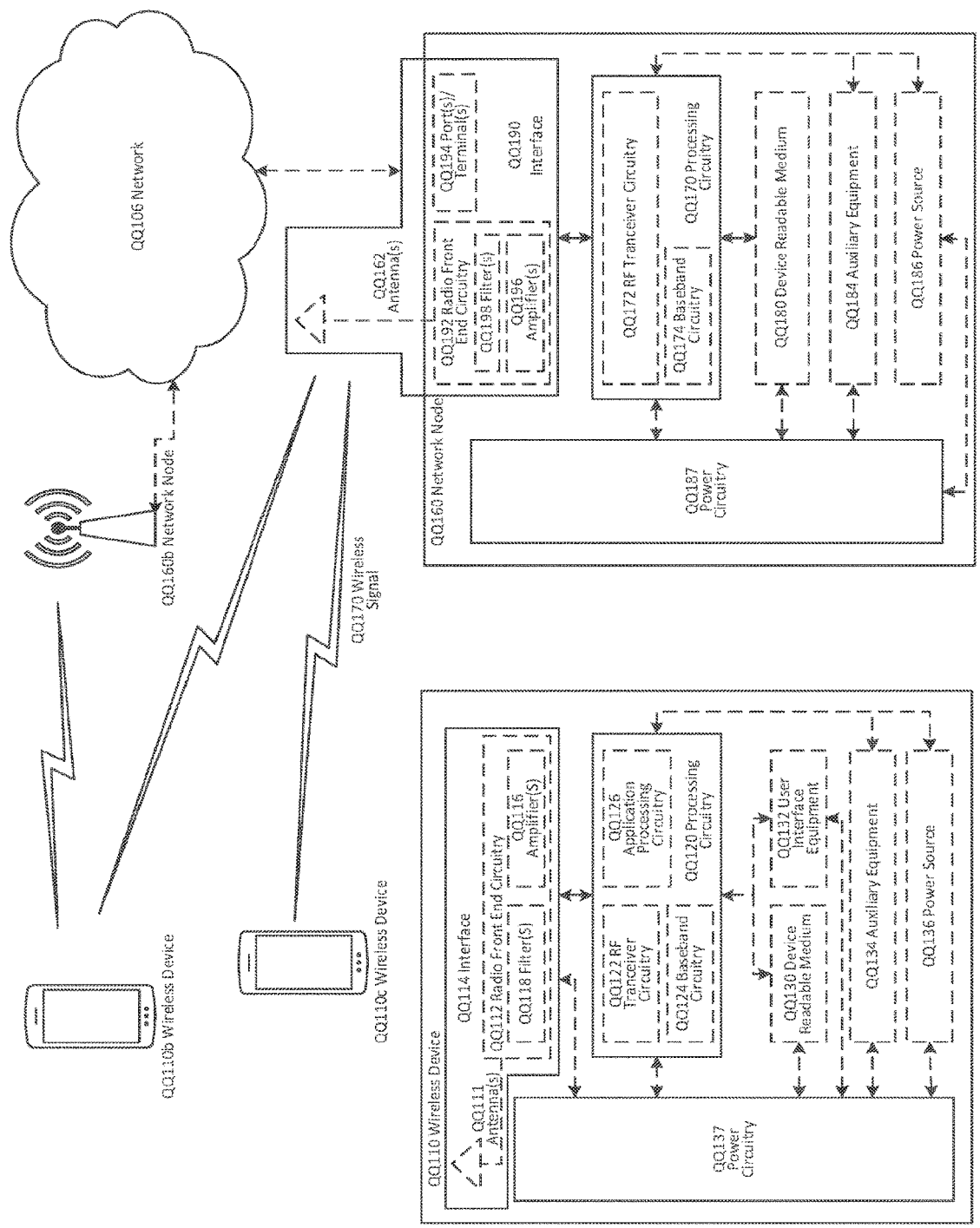
FIG. 7 is a block diagram of a network and some network components.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source Q0186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 7 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 8:
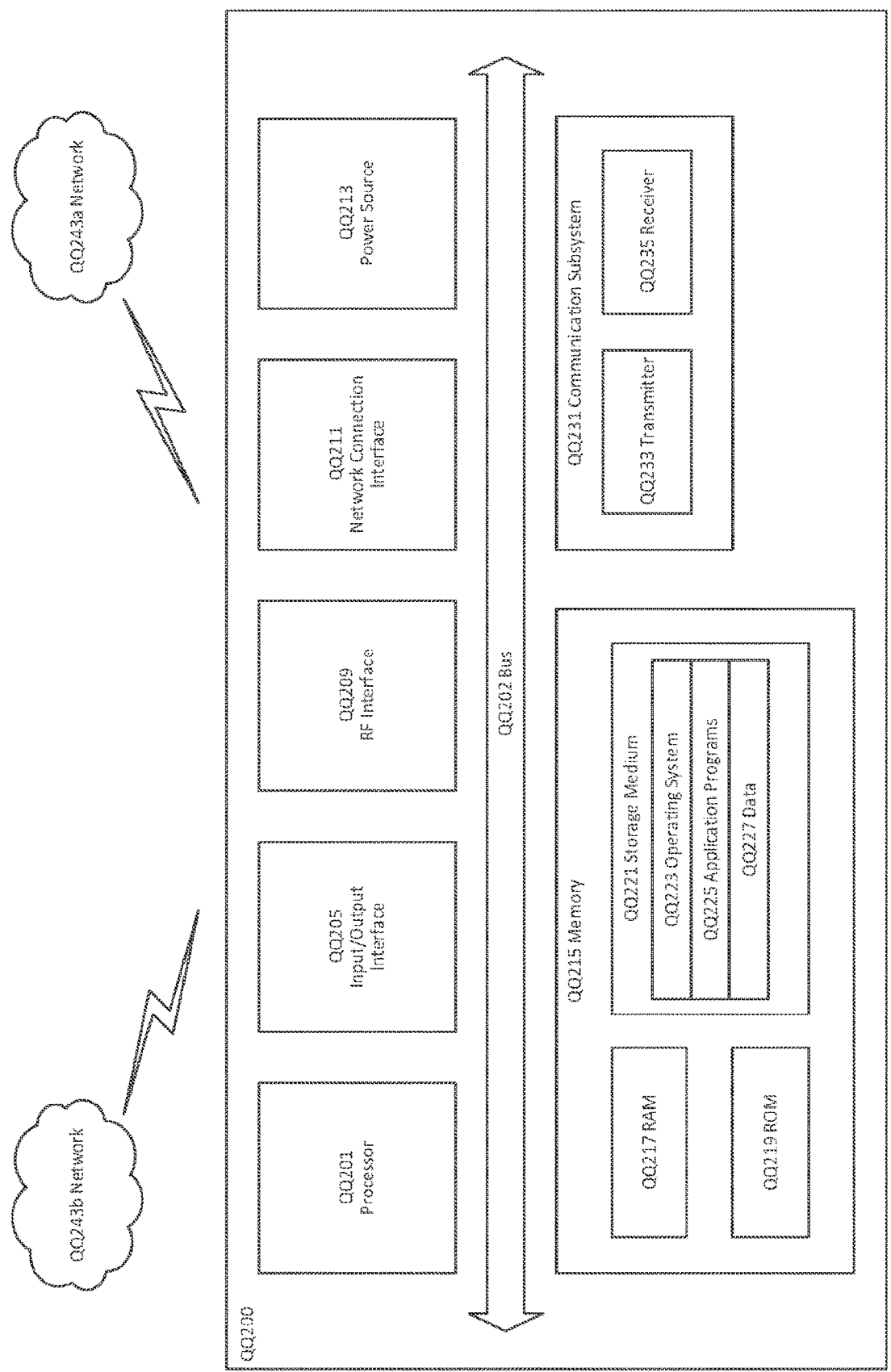
FIG. 8 is a block diagram of a User Equipment.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium Q0221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 8, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.002, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
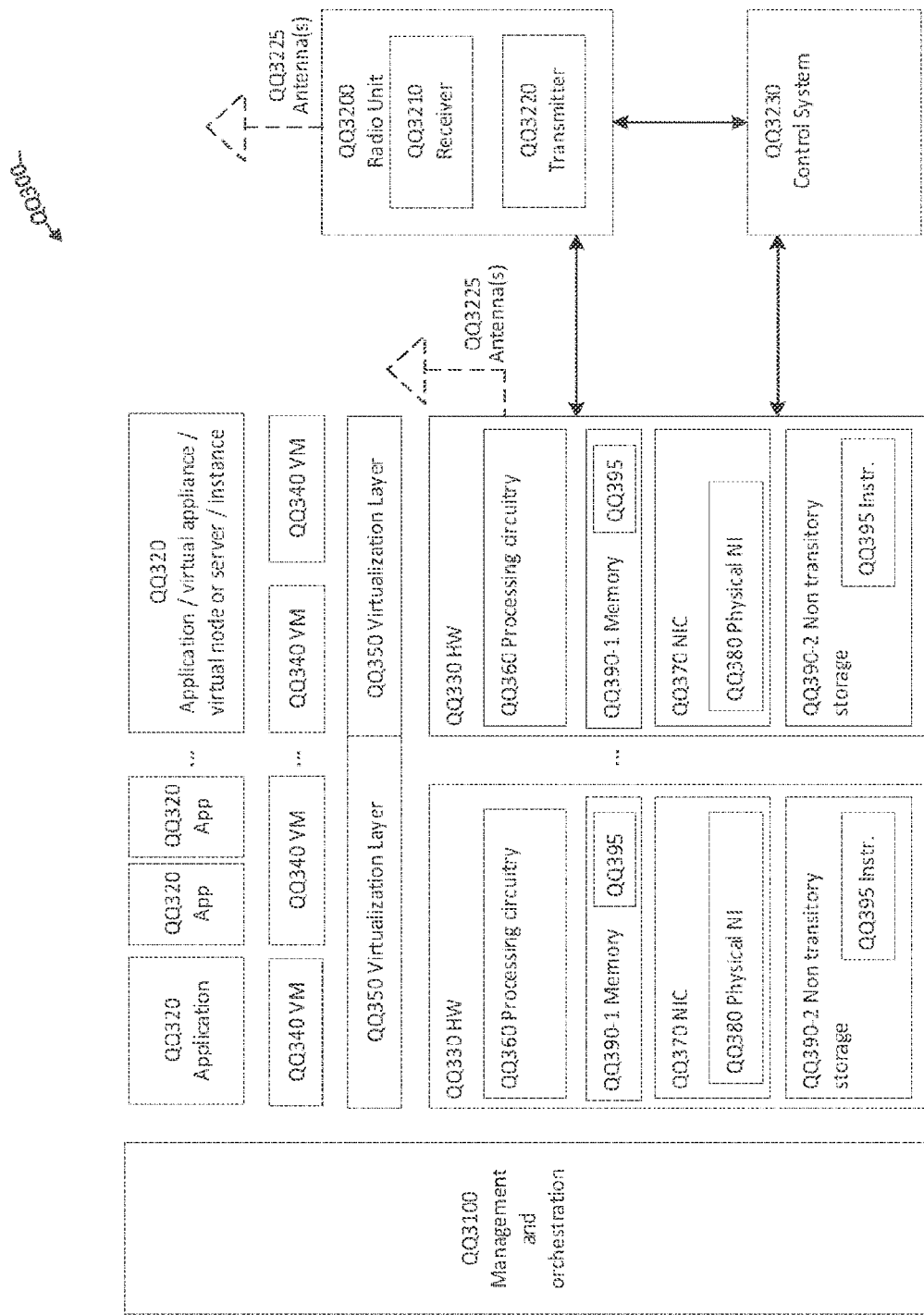
FIG. 9 is a schematic block diagram illustrating a virtualization environment.

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 9, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 10:
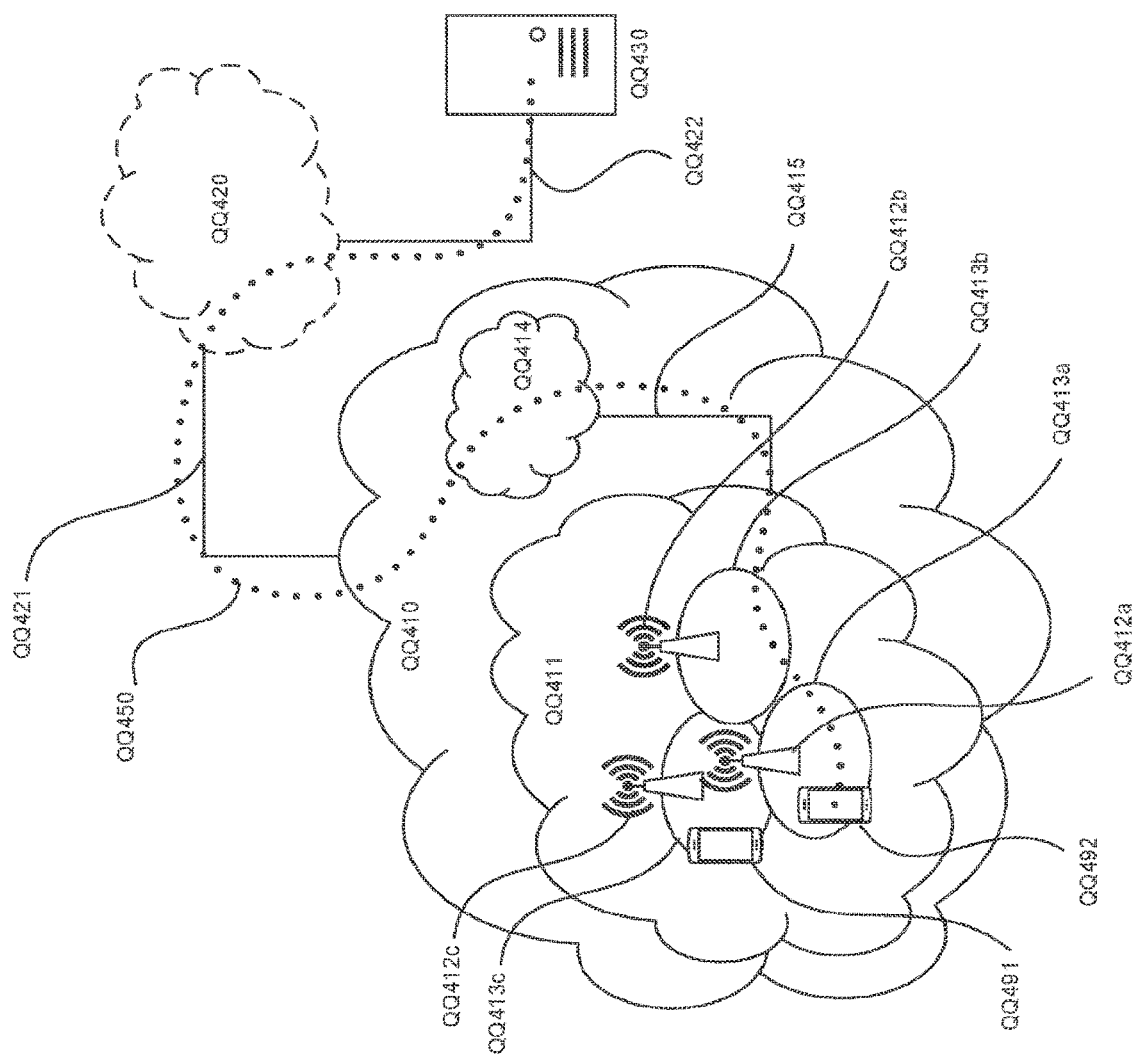
FIG. 10 illustrates a telecommunication network connected via an intermediate network to a host computer.

FIG. 10 illustrates a telecommunication network connected via an intermediate network to a host computer in accordance with some embodiments. In particular, with reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 11:
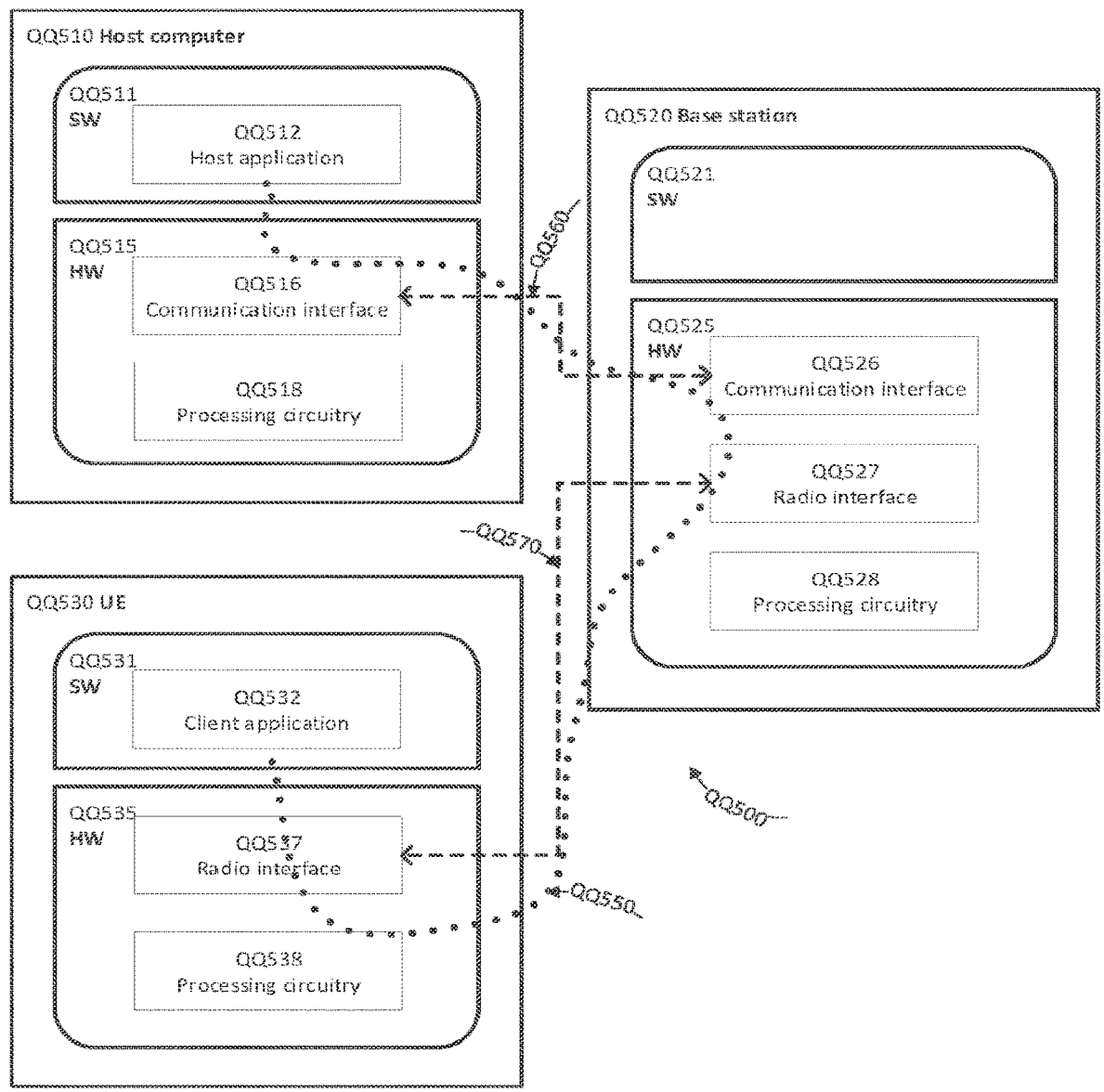
FIG. 11 illustrates host computer communicating via a base station with a user equipment over a partially wireless connection.

Example implementations, in accordance with an embodiment, of the UE, base station and host computer discussed in the preceding paragraphs will now be described with reference to FIG. 11. FIG. 11 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the network access performance and thereby provide benefits such as more orderly network access when large numbers of wireless devices attempt simultaneous access, thus reducing the instantaneous processing load at the base station, and preserving battery power in the wireless devices due to decreased repeated access attempts.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
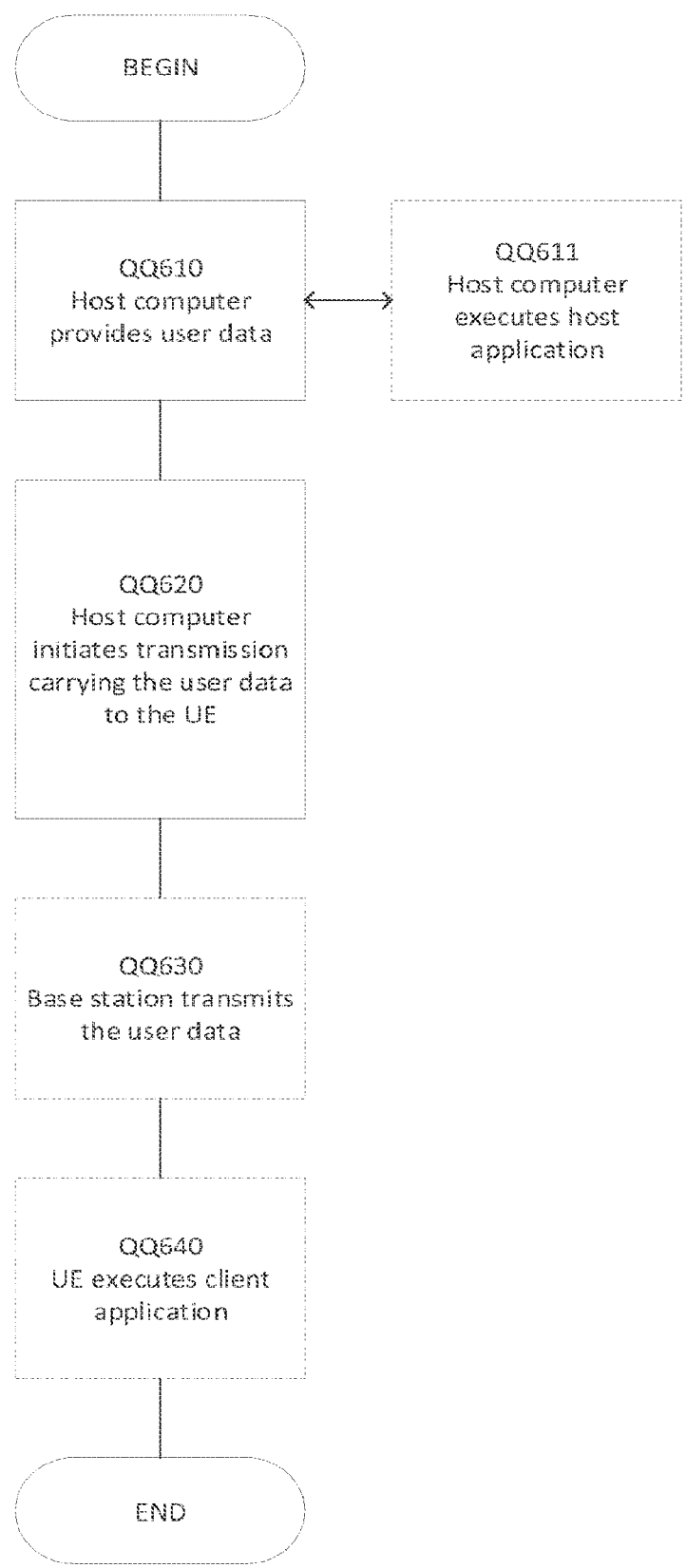
FIG. 12 is a flowchart illustrating a host computer communicating with a UE in a communication system.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
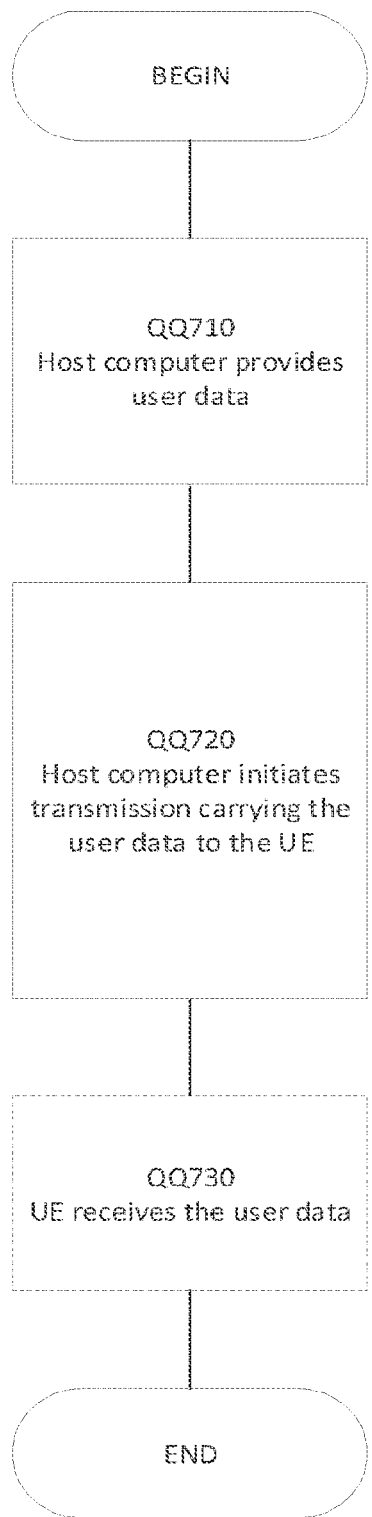
FIG. 13 is a flowchart illustrating a host computer communicating with a UE in a communication system.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 14:
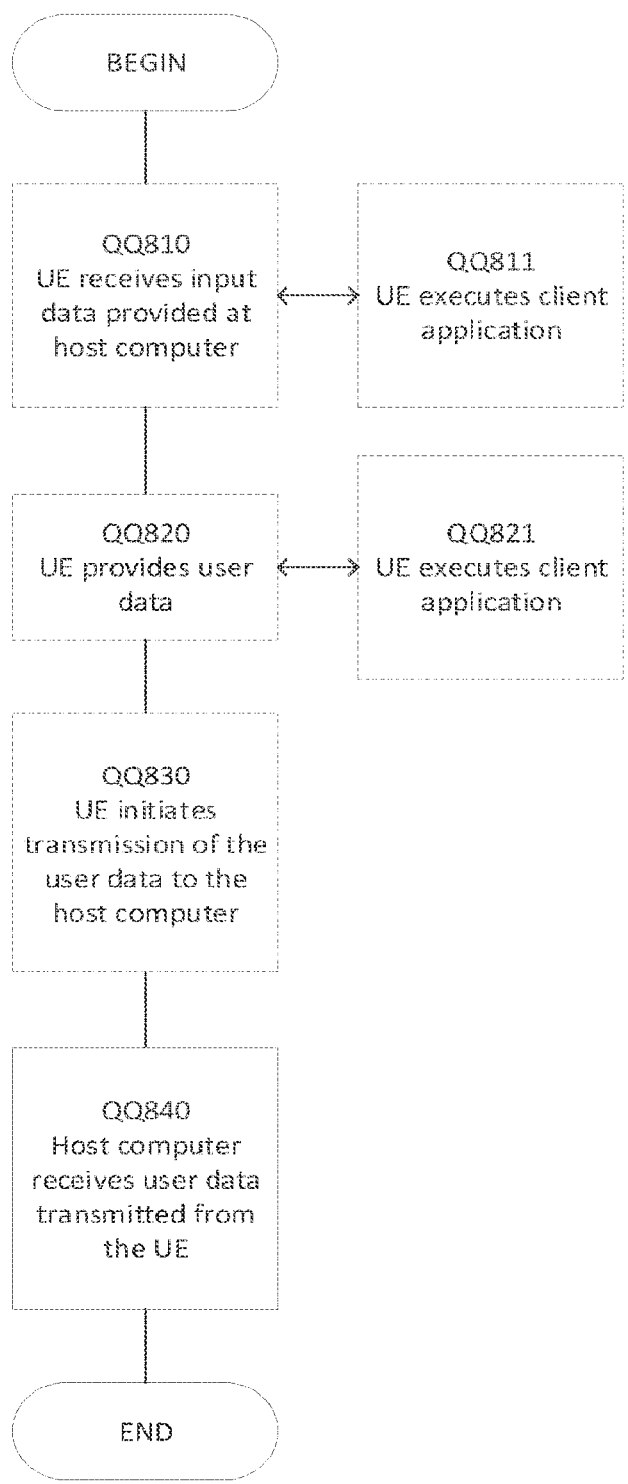
FIG. 14 is a flowchart illustrating a UE communicating with a host computer in a communication system.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 15:
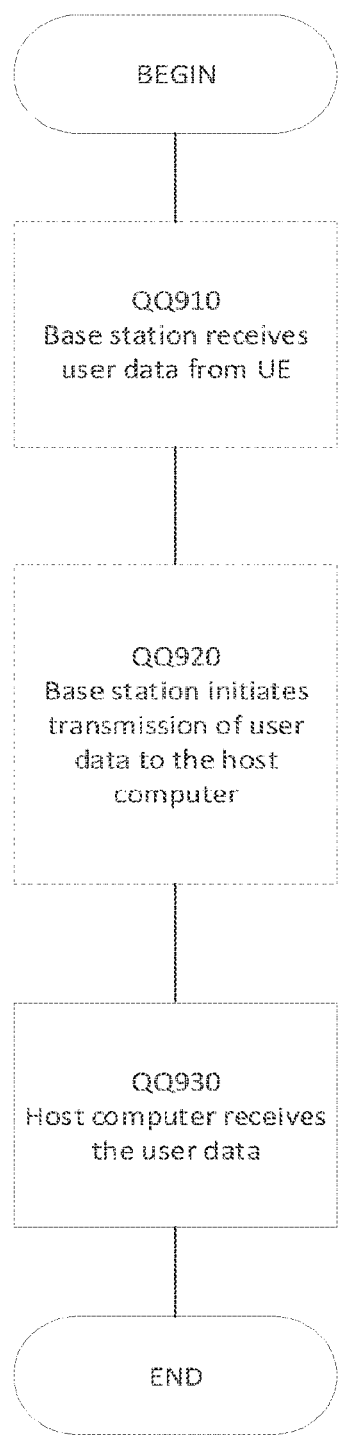
FIG. 15 is a flowchart illustrating communication between a base station and a host computer in a communication system.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following specific embodiments illustrate implementation of embodiments of the present invention in Over the Top embodiments, with reference to the claims:

Group A Embodiments include claims 1-20 and embodiment AA:

AA. The method of any of claims 1-20, further comprising:
providing user data; and
forwarding the user data to a host computer via the transmission to the base station.

Group B Embodiments include claims 43-63 and embodiment BB:

BB. The method of any of claims 43-63, further comprising:
obtaining user data; and
forwarding the user data to a host computer or a wireless device.

Group C Embodiments:

C1. A wireless device configured to perform any of the steps of any of the Group A embodiments.

C2. A wireless device comprising:
processing circuitry configured to perform any of the steps of any of the Group A embodiments; and
power supply circuitry configured to supply power to the wireless device.

C3. A wireless device comprising:
processing circuitry and memory, the memory containing instructions executable by the processing circuitry whereby the wireless device is configured to perform any of the steps of any of the Group A embodiments.

C4. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A base station configured to perform any of the steps of any of the Group B embodiments.

C8. A base station comprising:
processing circuitry configured to perform any of the steps of any of the Group B embodiments;
power supply circuitry configured to supply power to the wireless device.

C9. A base station comprising:
processing circuitry and memory, the memory containing instructions executable by the processing circuitry whereby the base station is configured to perform any of the steps of any of the Group B embodiments.

C10. A computer program comprising instructions which, when executed by at least one processor of a base station, causes the base station to carry out the steps of any of the Group B embodiments.

C11. A carrier containing the computer program of embodiment C10, wherein the carrier is one of an electronic signal, optical signal, radio signal, or computer readable storage medium.

Group D Embodiments:

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
  the processing circuitry of the host computer is configured to execute a host application, thereby providing the user data; and
  the UE's processing circuitry is configured to execute a client application associated with the host application.

D12. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
  the processing circuitry of the host computer is configured to execute a host application; and
  the UE's processing circuitry is configured to execute a client application associated with the host application, thereby providing the user data.

D18. The communication system of the previous 4 embodiments, wherein:
  the processing circuitry of the host computer is configured to execute a host application, thereby providing request data; and
  the UE's processing circuitry is configured to execute a client application associated with the host application, thereby providing the user data in response to the request data.

D19. A method implemented in a communication system including a host computer, a base station and a user equipment (UE), the method comprising:
  at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
  at the UE, executing a client application, thereby providing the user data to be transmitted; and
  at the host computer, executing a host application associated with the client application.

D22. The method of the previous 3 embodiments, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
  the processing circuitry of the host computer is configured to execute a host application;
  the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method, performed by a wireless device, of reporting transmission power information to a network node in a wireless communication network, the method comprising:
selecting which of two or more formats for power headroom (PH) or maximum transmission power (Pcmax), or mapping tables for PH or Pcmax, to employ in response to detecting one or more trigger criteria;
communicating the selection of formats for PH or Pcmax, or selection of mapping tables for PH or Pcmax, with the network; and
transmitting to the network a power headroom report (PHR) comprising at least one of a PH or Pcmax index with the selected format, based on the selected PH or Pcmax mapping table, respectively;
wherein a trigger criterion is a carrier frequency or carrier frequency range associated with a network node.

2. A wireless device configured to report transmission power information to a network node in a wireless communication network, comprising:
communication circuitry; and
processing circuitry operatively connected to the communication circuitry and configured to:
select which of two or more formats for power headroom (PH) or maximum transmission power (Pcmax), or mapping tables for PH or Pcmax, to employ in response to detecting one or more trigger criteria;
communicate the selection of formats for PH or Pcmax, or selection of mapping tables for PH or Pcmax, with the network; and
transmit to the network a power headroom report (PHR) comprising at least one of a PH or Pcmax index with the selected format, based on the selected PH or Pcmax mapping table, respectively;
wherein a trigger criterion is a carrier frequency or carrier frequency range associated with a network node.

3. The wireless device of claim 2, wherein the network node is a serving node of the wireless device.

4. The wireless device of claim 2, wherein the wireless device is in Dual Connectivity and the network node is the secondary serving node but is aware of the carrier frequency or carrier frequency range associated with the serving node.

5. The wireless device of claim 2, wherein another trigger criterion is one of: an ability of the wireless device to operate in a particular frequency range; a capability of the wireless device associated with its power class; a Pcmax estimation plane; an ability of the wireless device to support all PH or Pcmax mapping tables; and a PHR format selected by the network for use by the wireless device.

6. The wireless device of claim 5, wherein the capability of the wireless device associated with its power class is a maximum transmit power.

7. The wireless device of claim 5, wherein the Pcmax estimation plane is predefined.

8. The wireless device of claim 2, wherein the network is aware of the format for PH or Pcmax and the mapping table for PH or Pcmax, based on an indication in a header of a logical channel identification or an indication in a Medium Access Control header.

9. The wireless device of claim 2, wherein the network is aware of the format for PH or Pcmax and the mapping table for PH or Pcmax, based on signaling between the wireless device and the network, which sets the format for PH or Pcmax and the mapping table for PH or Pcmax of the wireless device until changed by further signaling.

10. The wireless device of claim 2, wherein transmitting to the network a PHR comprises one of: using a PHR format selected in response to a frequency band configured for the wireless device; utilizing one or more reserved bits in a PHR format defined in Long Term Evolution (LTE); transmitting a 7-bit PH or Pcmax value utilizing a 6-bit PH or Pcmax field and a Reserved bit of a predefined PHR Medium Access Control (MAC) Control Element; and transmitting a PH or Pcmax value utilizing a PHR MAC Control Element defined for the size of the PH or Pcmax value.

11. The wireless device of claim 2, wherein selecting which of two or more PH or Pcmax mapping tables to employ comprises one of: selecting which of two or more subsets of a single, extended PH or Pcmax mapping table to employ; and selecting one of a first PH or Pcmax mapping table having a 6-bit index and a second PH or Pcmax mapping table having a 7-bit index.

12. The wireless device of claim 2, wherein a serving cell of the wireless device is configured with one of Dual Connectivity, Carrier Aggregation, and a Supplementary Uplink carrier, and wherein selecting which of two or more PH or Pcmax mapping tables to employ comprises selecting both of a first PH or Pcmax mapping table having a 6-bit index for use on a lower frequency carrier and a second PH or Pcmax mapping table having a 7-bit index for use on a higher frequency carrier.

13. A method, performed by a node operative in a wireless communication network, of receiving transmission power information from a wireless device, the method comprising:
communicating the selection of which of two or more formats for power headroom (PH) or maximum transmission power (Pcmax), or mapping tables for PH or Pcmax, to employ in response to one or more trigger criteria, with the wireless device; and
receiving from the wireless device a power headroom report (PHR) comprising at least one of a PH or Pcmax index with the selected format, based on the selected PH or Pcmax mapping table, respectively;
wherein a trigger criterion is a carrier frequency or carrier frequency range associated with a network node.

14. A network node operative in a wireless communication network and configured to receive transmission power information from a wireless device, comprising:
communication circuitry; and
processing circuitry operatively connected to the communication circuitry, and configured to:
communicate the selection of which of two or more formats for power headroom (PH) or maximum transmission power (Pcmax), or mapping tables for PH or Pcmax, to employ in response to one or more trigger criteria, with the wireless device; and
receive from the wireless device a power headroom report (PHR) comprising at least one of a PH or Pcmax index with the selected format, based on the selected PH or Pcmax mapping table, respectively; wherein a trigger criterion is a carrier frequency or carrier frequency range associated with a network node.

15. The network node of claim 14, wherein the network node is a serving node of the wireless device.

16. The network node of claim 14, wherein the wireless device is in Dual Connectivity, and the network node is the secondary serving node but is aware of the carrier frequency or carrier frequency range associated with the serving node.

17. The network node of claim 14, wherein a further trigger criterion is one of: an ability of the wireless device to operate in a particular frequency range; a capability of the wireless device associated with its power class; a Pcmax estimation plane; an ability of the wireless device to support all PH or Pcmax mapping tables; and a PHR format selected by the network for use by the wireless device.

18. The network node of claim 17, wherein the capability of the wireless device associated with its power class is a maximum transmit power.

19. The network node of claim 17, wherein the Pcmax estimation plane is predefined.

20. The network node of claim 14, wherein the network node is aware of the format for PH or Pcmax and the mapping table for PH or Pcmax, based on an indication in a header of a logical channel identification or an indication in a Medium Access Control header.

21. The network node of claim 14, wherein the network node is aware of the format for PH or Pcmax and the mapping table for PH or Pcmax, based on signaling between the wireless device and the base station, which sets the format for PH or Pcmax and the mapping table for PH or Pcmax of the wireless device until changed by further signaling.

22. The network node of claim 14, wherein receiving a PHR from the wireless device comprises one of: using a PHR format selected in response to a frequency band configured for the wireless device; utilizing one or more reserved bits in a PHR format defined in LTE; receiving a 7-bit PH or Pcmax value utilizing a 6-bit PH or Pcmax field and a Reserved bit of a predefined PHR Medium Access Control (MAC) Control Element; and receiving a PH or Pcmax value utilizing a PHR MAC Control Element defined for the size of the PH or Pcmax value.

23. The network node of claim 14, wherein selecting which of two or more PH or Pcmax mapping tables to employ comprises one of: selecting which of two or more subsets of a single, extended PH or Pcmax mapping table to employ; and selecting one of a first PH or Pcmax mapping table having a 6-bit index and a second PH or Pcmax mapping table having a 7-bit index.

24. The network node of claim 14, wherein a serving cell of the wireless device is configured with one of Dual Connectivity, Carrier Aggregation and a Supplementary Uplink carrier, and wherein selecting which of two or more PH or Pcmax mapping tables to employ comprises selecting both of a first PH or Pcmax mapping table having a 6-bit index for use on a lower frequency carrier and a second PH or Pcmax mapping table having a 7-bit index for use on a higher frequency carrier.

* * * * *